US008421591B2

(12) United States Patent
Karasek

(10) Patent No.: US 8,421,591 B2
(45) Date of Patent: Apr. 16, 2013

(54) METHOD AND SYSTEM OF CONDITIONALLY OPERATING A MOVABLE BARRIER

(75) Inventor: Mark L. Karasek, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 522 days.

(21) Appl. No.: 12/712,866

(22) Filed: Feb. 25, 2010

(65) Prior Publication Data

US 2011/0205013 A1 Aug. 25, 2011

(51) Int. Cl.

| | |
|---|---|
| ***G06F 7/04*** | (2006.01) |
| ***G05B 19/00*** | (2006.01) |
| ***B60R 25/00*** | (2006.01) |

(52) U.S. Cl.
USPC ............ 340/5.71; 340/5.1; 340/5.7; 340/598; 726/2; 726/12; 726/17

(58) Field of Classification Search ........................ None
See application file for complete search history.

(56) References Cited

U.S. PATENT DOCUMENTS

| | | | | |
|---|---|---|---|---|
| 4,573,046 | A * | 2/1986 | Pinnow | 340/5.64 |
| 6,002,332 | A * | 12/1999 | King | 340/545.1 |
| 6,404,337 | B1 | 6/2002 | Van Till et al. | |
| 6,427,913 | B1 * | 8/2002 | Maloney | 235/383 |
| 2003/0193388 | A1 * | 10/2003 | Ghabra et al. | 340/5.61 |
| 2004/0257199 | A1 | 12/2004 | Fitzgibbon et al. | |
| 2006/0091998 | A1 | 5/2006 | Fitzgibbon | |
| 2006/0145811 | A1 * | 7/2006 | Nantz et al. | 340/5.72 |
| 2006/0164208 | A1 * | 7/2006 | Schaffzin et al. | 340/5.64 |
| 2007/0290792 | A1 * | 12/2007 | Tsuchimochi et al. | 340/5.61 |
| 2008/0061926 | A1 * | 3/2008 | Strait | 340/5.22 |
| 2008/0092443 | A1 * | 4/2008 | Herman et al. | 49/25 |
| 2008/0130791 | A1 * | 6/2008 | Fitzgibbon | 375/310 |
| 2009/0273438 | A1 * | 11/2009 | Sultan et al. | 340/5.7 |
| 2010/0242369 | A1 * | 9/2010 | Laird | 49/358 |

* cited by examiner

*Primary Examiner* — Jennifer Mehmood
*Assistant Examiner* — Fekadeselassie Girma
(74) *Attorney, Agent, or Firm* — Fitch Even Tabin & Flannery LLP

(57) ABSTRACT

A method and system provides conditional allowance of access by operating a movable barrier such that access is not granted unless another condition is met. In one illustrative approach, a first signal is received and, if a second signal is received within a set time frame relative to receipt of the second signal, a movable barrier operator is then activated. By one approach, one of the signals is a long-range transmission, and the other signal is a visual-range transmission.

22 Claims, 8 Drawing Sheets

300

800

METHOD AND SYSTEM OF CONDITIONALLY OPERATING A MOVABLE BARRIER

TECHNICAL FIELD

This invention relates generally to methods and devices for controlling movable barriers. More specifically, it relates to entry control systems for actuating movable barriers.

BACKGROUND

Individuals who work during the 9-to-5 hours typically are not at home when home access is desired for delivery of goods or for performance of home repair services. Work schedules for many people make it difficult, if not impossible, to be at home to accept goods being delivered or allow service people into their homes. In addition to delivery or service individuals, it may be desirable to permit some routine or frequent visitors to have conditional access to one's home, such as a home cleaning service or dry-cleaning pick-up and drop-off, to note a few.

Furthermore, when such delivery and service appointments are made, it is often requested that an individual be available for delivery or service during a time period lasting several hours. When trying to arrange a time for delivery and services, these providers usually require someone to be at the home for nearly half a day and will not, or cannot, pinpoint a specific arrival time.

Many homes have entry systems which control various access points for the home, such as, for example, an automatic garage door operator which raises and lowers the garage door after it receives an appropriate signal from the associated control circuitry. Generally, such control systems include input devices such as wall mounted keypads, hand held radio frequency transmitters, or simple actuating buttons. In some installations, security measures are imposed to prevent unauthorized access to the garage area. For example, a keypad mounted on an exterior wall may require the entry of a secrete code to permit operation of the garage door operator. Additionally, garage door operator hand held transmitter units may communicate with the control circuitry of the garage door operator via encoded signals, thereby attempting to ensure that only authorized vehicles are granted access to the garage area. Further, these types of systems are not limited to garage door operators but maybe extended to entry gates, alarm systems, or even the front door lock mechanism of a house itself.

With a garage door entry system a homeowner could give the delivery service a programmable code that can be entered in a keypad on an outside wall of the door. Nonetheless, for security reasons, a homeowner may not wish to give such third parties a permanent means to gain access to their home. However, the codes and/or transmitters given to third parties do not typically require any further verification. Thus, one seeking to gain unauthorized accesses need only to obtain the code and/or transmitter from the authorized third party to gain access.

As suggested by the availability of numerous features for electronic devices, consumers desire a primary wireless device that can function as a cell phone, a personal data assistant, a camera, and a GPS device, among other desired functionalities. To that end, consumers would like to have the ability to use to their primary wireless devices to gain access to their homes such as through wireless operation of their garage doors or security system. However, the use of such long-range communication devices has a variety of attendant concerns. With long-range capabilities, the potential for improper and inadvertent access grows. For example, it is not uncommon for an improperly stowed cell phone to accidentally transmit a telephone call. Further, if the signal transmitted was sent to an entry control system, it could operate a movable barrier. In such circumstances, the homeowner may be miles away from the location and may be completely unaware of the activation of the movable barrier operator.

SUMMARY

Generally speaking, a convenient method and system is provided for operating a movable barrier by providing conditional allowance of access such that access is not granted unless another condition is met. In one illustrative embodiment, a first signal is received and, if a second signal is received within a set time frame relative to receipt of the first signal, a movable barrier is then operated by the movable barrier operator. By one approach, the first signal may be a long-range transmission and the second signal may be a visual-range transmission. Further, the long-range transmission may be received before, during, or after receipt of the short-range transmission signal as long as the two transmissions are received within the given time frame.

By one approach, the long-range transmission may include a cell phone transmission, an internet transmission, an e-mail receipt, a security system transmission, a long-range radio transmission, a local area network transmission, and/or a plain old telephone system (POTS) transmission. Further, an e-mail receipt may be comprised of a local area network transmission and/or an internet transmission. It is contemplated that the visual-range transmission may be detected by a magnetic detector such as a loop detector or a magnetic anomaly detector, a motion detector device, a short-range transmission detector, a capacitive detector, a weight-based detector, a push button detector, and a keypad.

Further, while the long-range transmitters may be employed in a number of locations, a visual-range transmission ensures that the long-range transmission has been verified by the presence of a visual-range signal. In the same manner, a short range transmission is also verified by a long-range transmission. The conditional allowance provided by one of the transmission signals is, therefore, verified by the additional signal. In such a manner, improper and inadvertent access from long-range transmission devices is reduced but also grants the user increased flexibility in granting third parties access to their homes without the risk of giving away too much security.

In another aspect, a method and system is provided for operating a home security system such as one with an alarm by providing conditional allowance to disarm or rearm such a system wherein such action is not taken by the security system until and unless another condition is met. In another aspect, the receivers receiving the transmissions may be contained within or outside of the secured area. By another approach, the movable barrier operator may control or be in communication with peripheral systems such as a security system. In such a configuration, the controller of the movable barrier operator may communicate with the alarm entry control such that operation of either device may be accomplished through control signals received by and sent from the other device.

BRIEF DESCRIPTION OF THE DRAWINGS

The above needs are at least partially met through provision of the method and system of conditionally operating a movable barrier described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
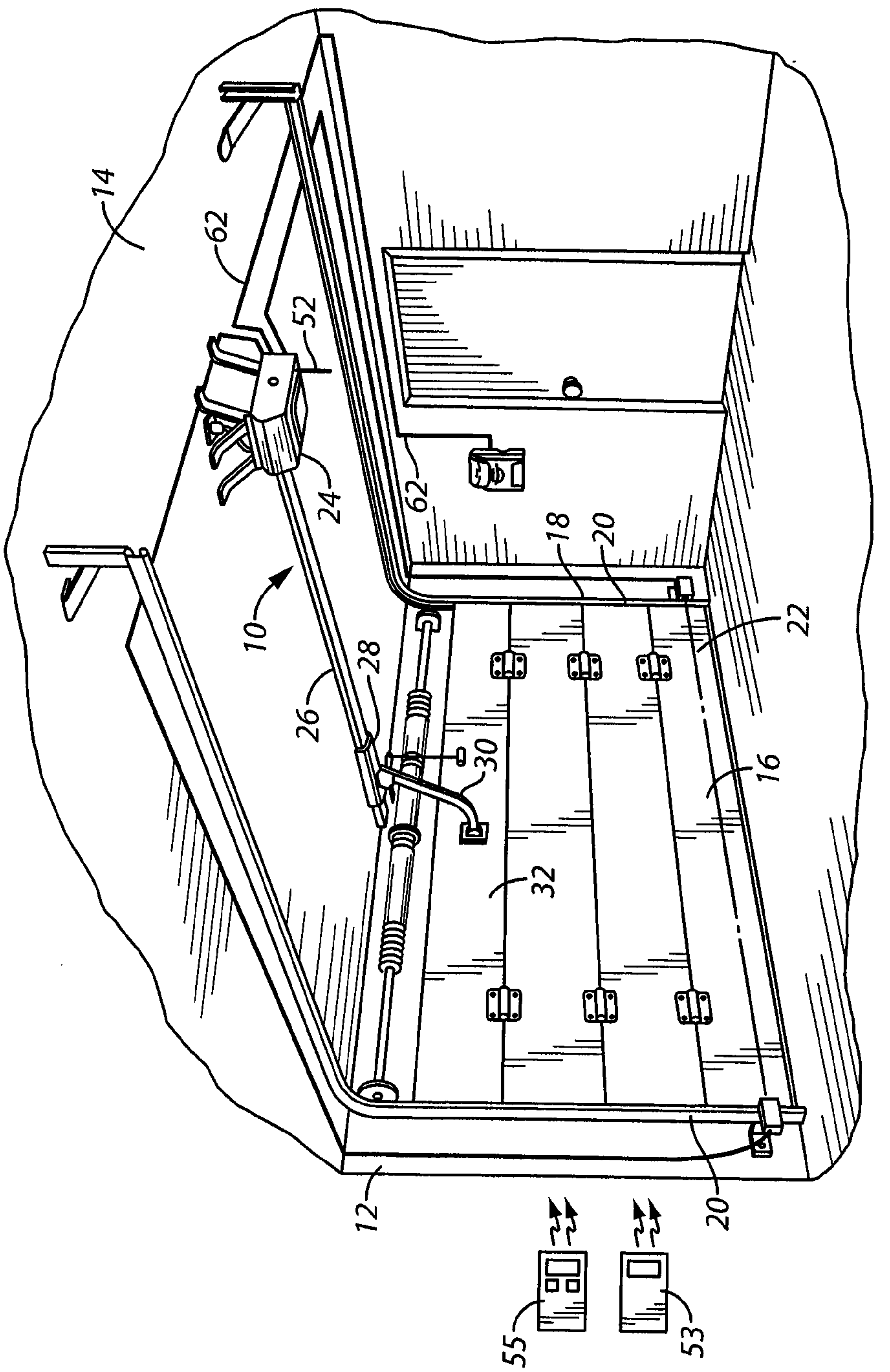
FIG. 1 comprises a perspective view of an inside of a garage with a movable barrier and operator as configured in accordance with various embodiments of the invention.

Referring now to the drawings, and in particular to FIG. 1, a movable barrier operator is shown therein denoted as reference 10. The movable barrier operator 10 is configured to control movement of the movable barrier between a first position and a second position. The movable barrier operator 10, as illustrated, is within garage 12. By one approach, it is mounted to a ceiling 14 of the garage 12 for operation of a movable barrier 16. In one illustrative embodiment, the movable barrier 16 is a multipanel garage door having a plurality of rollers 18 that ride within a pair of tracks 20 positioned adjacent to and on opposite sides of a garage opening 22.

In the illustrative example of FIG. 1, the movable barrier operator 10 also includes a head unit 24 for providing motion to the movable barrier 16 via a rail assembly. The rail assembly 26 includes a trolley 28 for releasable connection of the head unit 24 to the movable barrier 16 via an arm 30. The arm 30 is connected to an upper portion 32 of the movable barrier 16 for opening and closing it. The trolley 28, connected to a drive chain, is driven thereby. By one approach, the chain is driven by a sprocket in the head unit 24. In such a configuration, the sprocket acts as a power takeoff for an electric motor located in the head unit 24.

Figure 2:
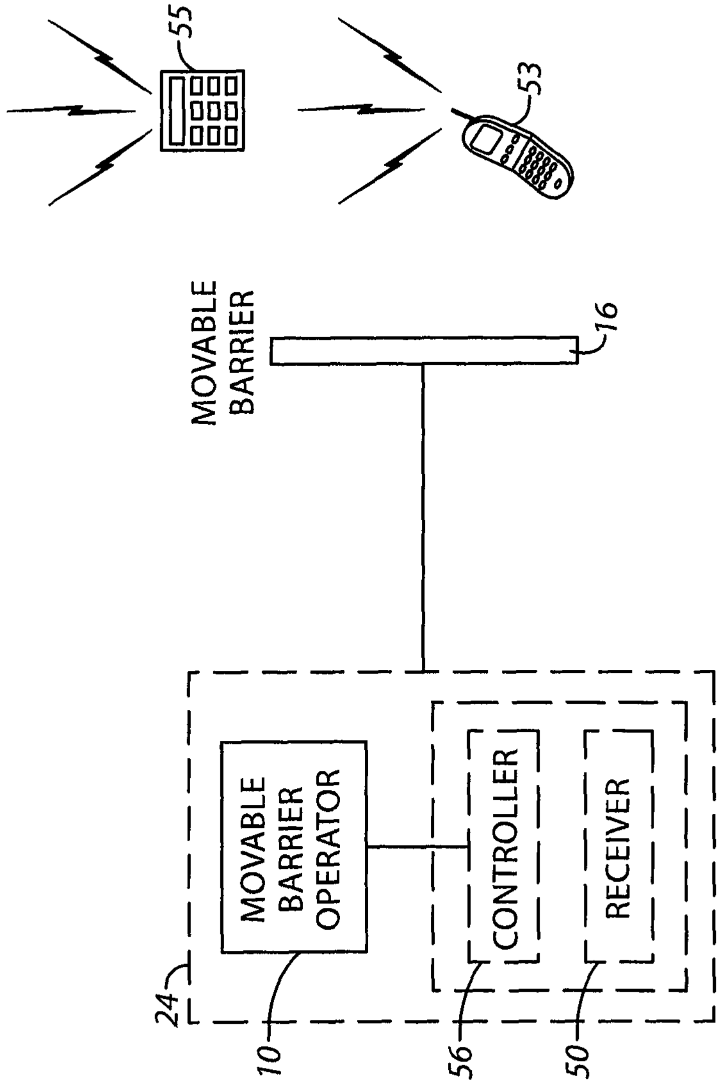
FIG. 2 comprises a schematic block diagram of an entry control system as configured in accordance with various embodiments of the invention.

The head unit 24 also may include a receiver 50 as illustrated in FIG. 2 for receiving transmissions from one or more transmitters 53, 55 discussed below. In addition, the head unit 24 may include several receivers 50 for receiving different signals. For example, the head unit 24 may include a long-range receiver configured to receive long-range transmission signals and a visual-range receiver configured to receive visual-range transmission signals. Alternatively, a single receiver 50 may be configured to receive a variety of different signals. The receiver 50 may have at least one antenna 52 associated therewith. The receiver 50 is in operative communication with the movable barrier operator 10 as is a controller 56. As illustrated in FIG. 2, the controller 56 and the receiver 50 may comprise physically separate elements or may be integrated into a single unit separate from or combined with the movable barrier operator 10. Each of these arrangements is known in the art and need no further explanation herein. The controller 56 is configured to interpret signals from the receiver 50 and provide code commands to control aspects of the movable barrier operator 10. When the movable barrier operator 10 is so instructed, the operator 10 activates and moves the movable barrier 16. For example, in the illustrative embodiment of FIG. 1, the trolley 28 moves along the rail assembly 26 thereby moving the movable barrier 16 up or down via arm 30. By one approach, when a long-range receiver and a short-range receiver have received signals, the controller 56 is programmed to execute a command to control movement of the movable barrier operator 10.

Figure 3:
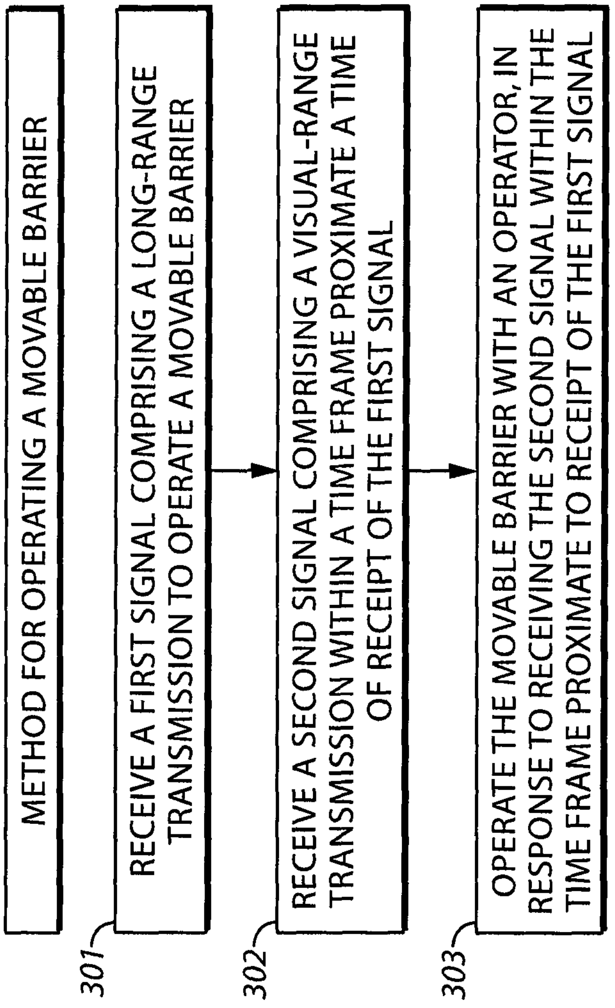
FIG. 3 comprises a block diagram illustrating a method for operating a movable barrier as configured in accordance with various embodiments of the invention.

Turning now to FIG. 3, a method 300 for operating a movable barrier, such as barrier 16, includes receiving 301 a first signal comprising a long-range transmission to operate a movable barrier. The method 300 further includes receiving 302 a second signal comprising a visual-range transmission within a set time frame relative to a time frame of receipt of the first signal. In various approaches, a set time frame relative to receipt of the first signal may be before, during, or after receipt of the second signal. Thus, either the first signal or the second signal may be received prior to the other of the two signals. The method also includes operating 303 the movable barrier with a movable barrier operator, in response to receiving the second signal within the time frame proximate to receipt of the first signal.

As mentioned, receipt of one of the signals that is relative to receipt of the other signal may be before, during, or after receipt of either signal. Thus, either one of the long-range transmission or the visual-range transmission may be received prior to the other of the transmissions. Further, in one approach, a set time frame may be about ten minutes or less. By another approach, a set time frame is approximately five minutes or less. By yet another approach, a set time frame is about three minutes or less. In still another approach, a homeowner may select different time frames for different signals and different combinations of signals.

Figure 4:
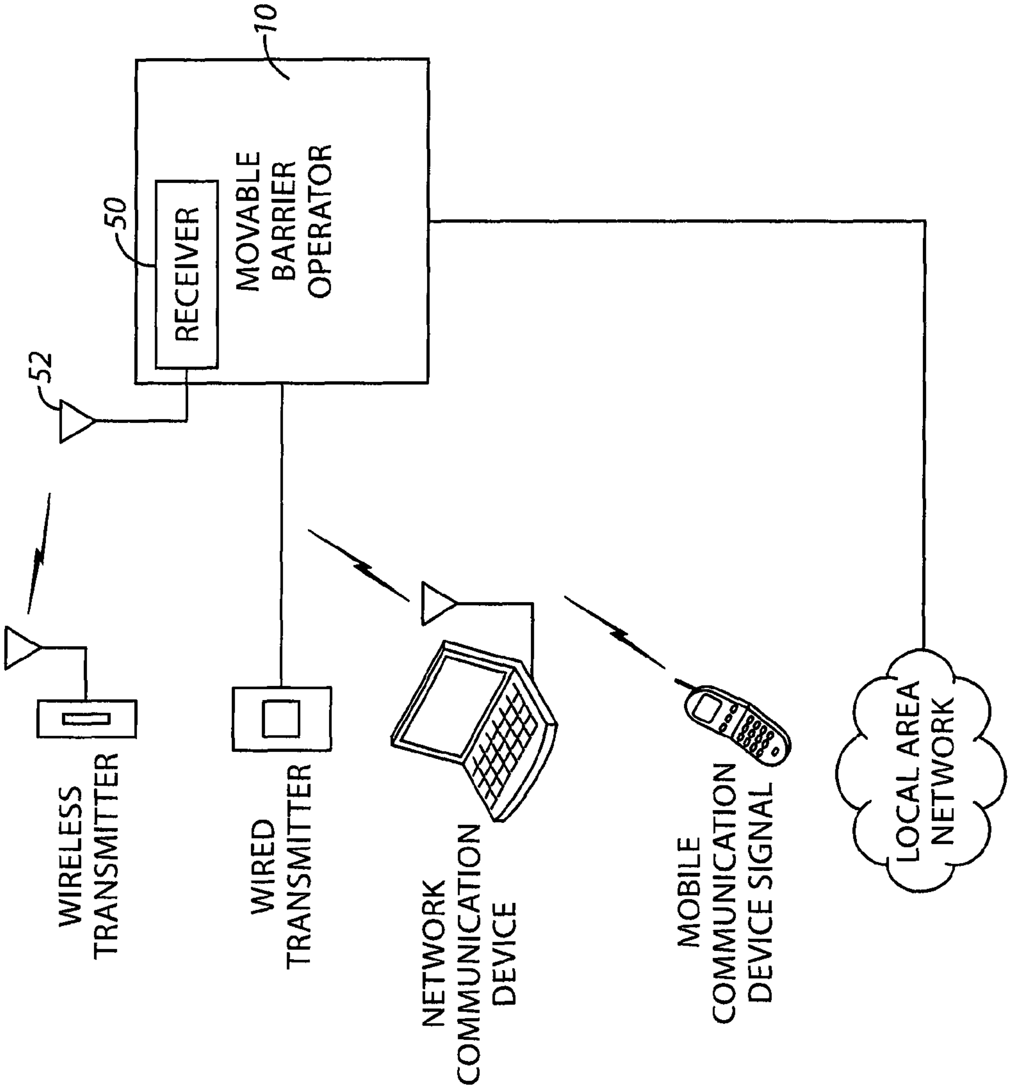
FIG. 4 comprises a schematic block diagram of portions of an entry control system as configured in accordance with various embodiments of the invention.

In one illustrative approach, a long-range transmission is one that may transmit beyond the distance that the unaided eye can see. For example, if the average unaided eye can see to a distance of 1,000 feet, then a long-range transmission is one that is capable of transmission beyond a distance of 1,000 feet. While a long-range transmission may transmit beyond that of a visual-range transmission, the transmission is not required to have come from farther away than visual-range. By one approach, a long-range transmission may include: a cell phone transmission including a text or short message service, an interne transmission, such as an e-mail, a short message service, a notification, a security system transmission, and a long-range radio transmission, to note but a few. Further, such a long-range transmission may be generated by a variety of devices. As illustrated in FIG. 4, a long range transmission may be generated by a wireless transmitter, a wired transmitter including a communication system terminal such as a telephone system, a network communication device, a mobile communication device, and a local area network connection, to note but a few options. For example, a local area network connection may include an electronic mail message sent over the local area network connection or an electronic message sent within a security system. Further, any one of the above transmissions, including long-range and short-range, may be an encoded transmission, such as a rolling code. See for example U.S. Pat. No. 6,154,544, which is incorporated by reference as if wholly rewritten herein.

Figure 5:
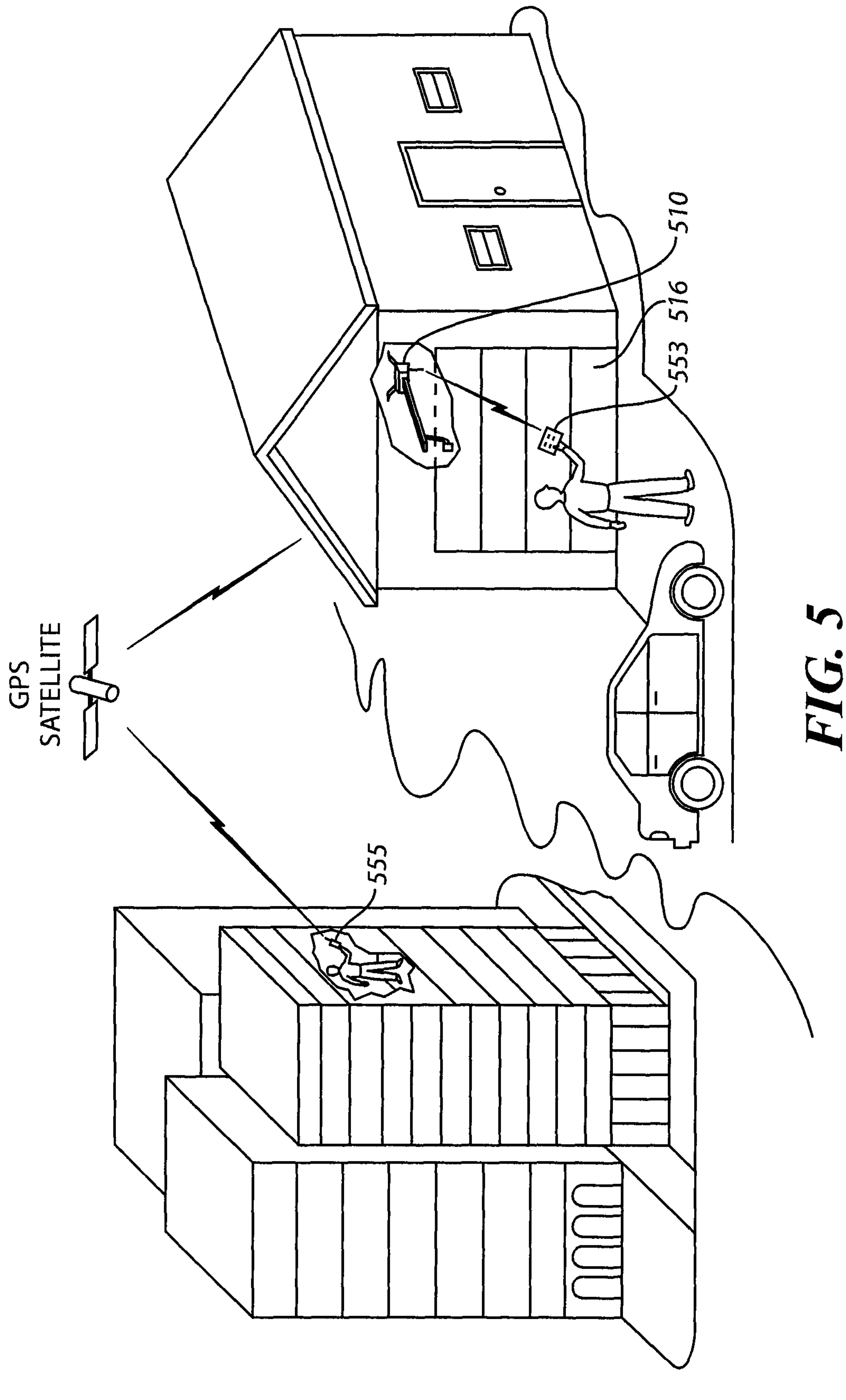
FIG. 5 comprises a schematic view of a movable barrier having an entry control system as configured in accordance with various embodiments of the invention.

An exemplary approach, shown in FIG. 5, illustrates a long-range transmission generated by a wireless transmitter 555 that cooperates with a cellular service to send a signal to the receiver 550 located at a movable barrier operator 510. Though the operator 510 has received one of the signals, the conditional allowance does not permit the operator 510 to move the movable barrier until receipt of the other of the two signals. Further, the operator 510 also is configured to receive both the long-range transmission from the wireless transmitter 555 and a visual-range transmission generated by a hand-held transmitter 553. Once signals from both receivers 553, 555 have been received within a given time frame, the operator 510 may operate to move a barrier 516 to provide access to the garage.

Figure 6:
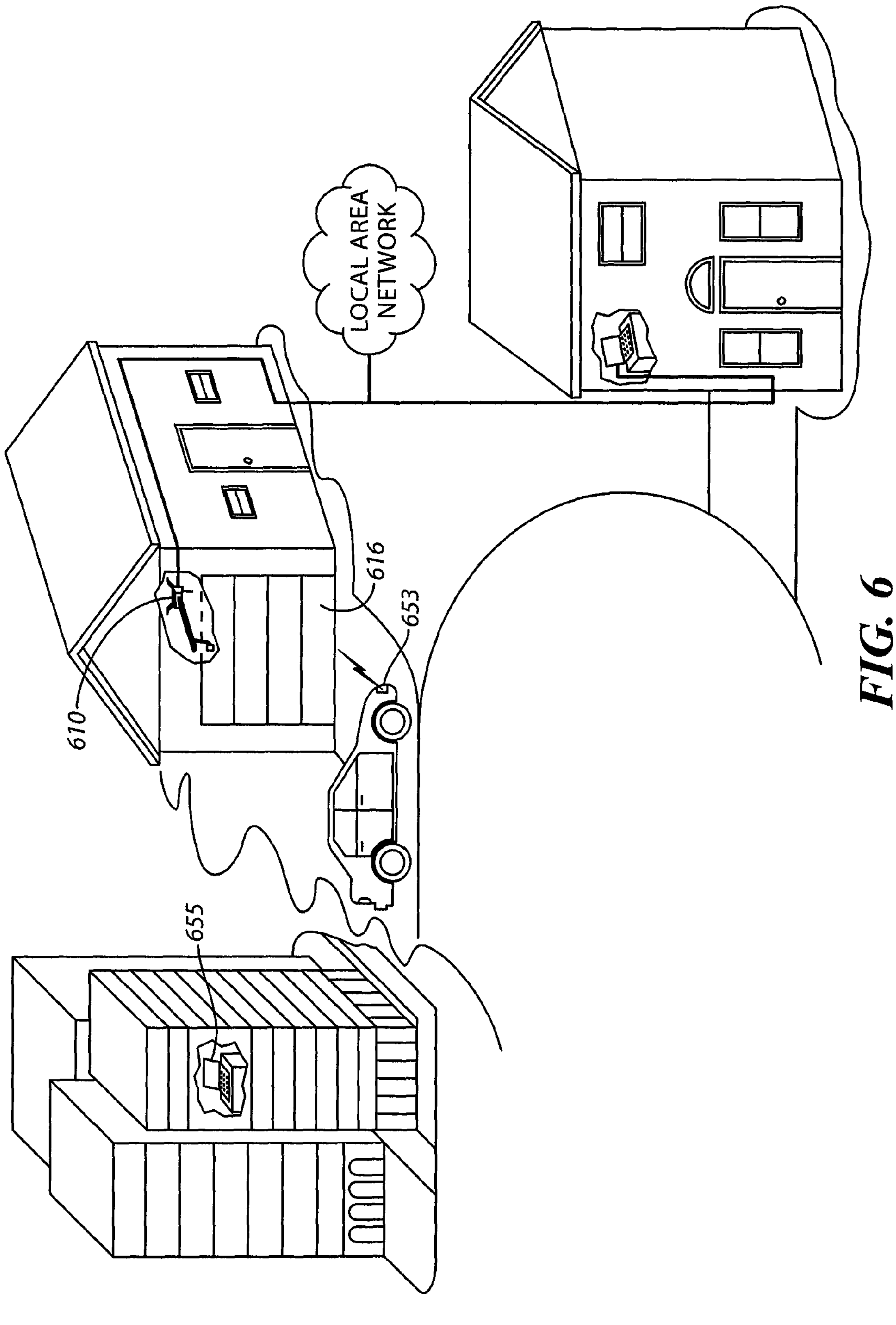
FIG. 6 comprises a schematic view of a movable barrier having an entry control system as configured in accordance with various embodiments of the invention.

It is anticipated that a number of different transmitters may be employed to generate the visual-range transmissions, even in a single embodiment. More particularly, the visual-range transmission may be detected via at least one of a magnetic detector such as a magnetic loop detector or magnetic anomaly detector as known in the art, a motion detector device, a capacitive detector, a weight-based detector, a push button detector, a keypad, or a short-range transmission detector, such as an infrared (IR) detector, radio frequency (RF) detector, to note but a few. In another embodiment, similar to that illustrated in FIG. 5, the second signal may be generated by the presence of the vehicle. For example, sensors may recognize that the vehicle is located in front of the access point, such as through a magnetic loop detector. In yet another example, similar to that illustrated in FIG. 5, a long range transmission such as an interne transmission 655 is used to send a signal to a movable barrier operator 610. The vehicle, as shown in FIG. 6, includes a radio frequency (RF) device 653 located on the vehicle, such as an RFID tag. Once the movable barrier operator 610 has received both the short range transmission 653 and the long range transmission 655, the operator 610 will activate to move the barrier 616.

Figure 7:
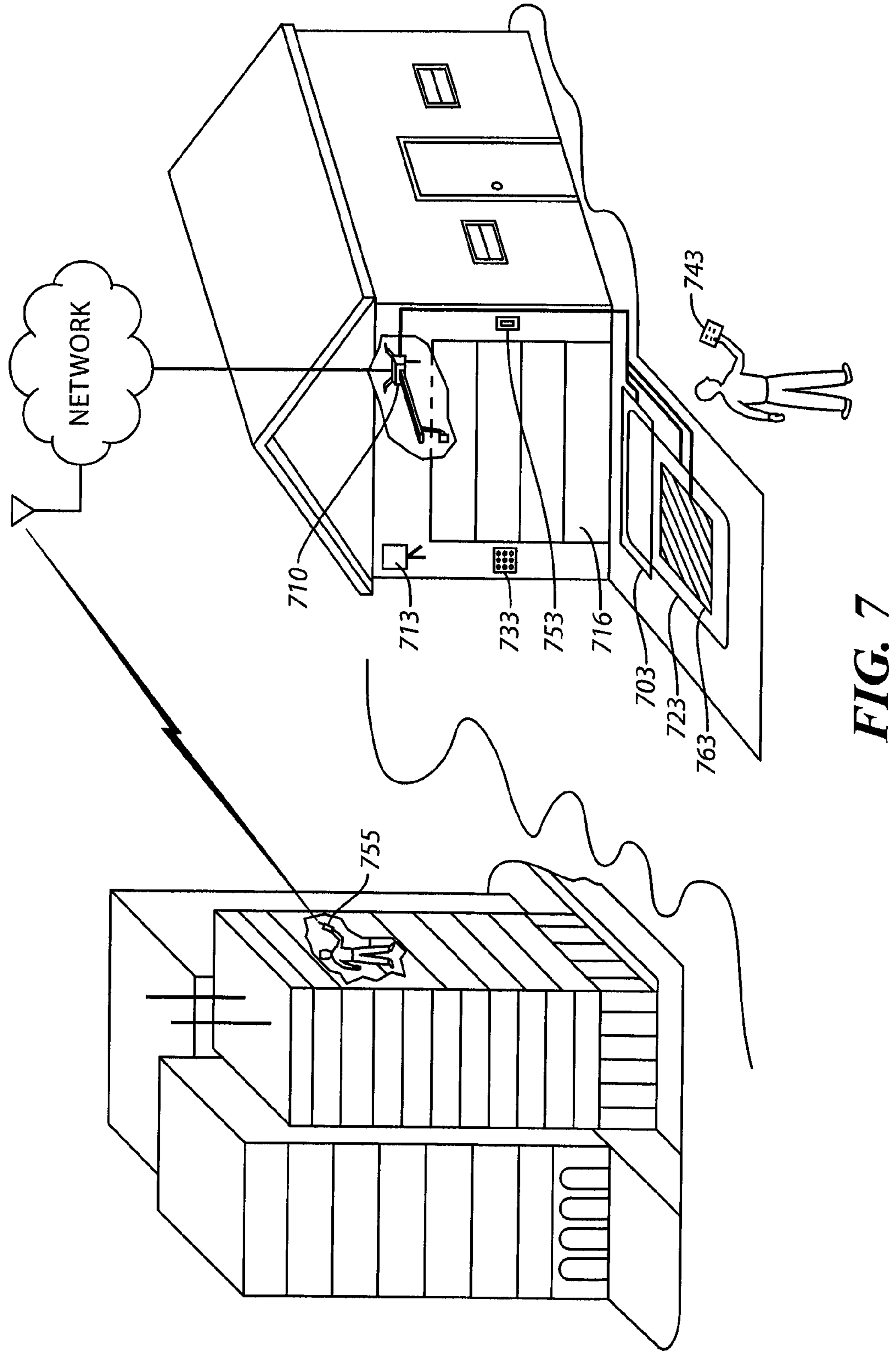
FIG. 7 comprises a schematic view of a movable barrier having an entry control system as configured in accordance with various embodiments of the invention.

As illustrated in FIG. 7, a variety of visual-range transmissions may be used, even in a single embodiment. The visual-range devices may include, for example, a magnetic loop detector 703, a motion detector 713, a weight based detector 723, a keypad 733, a push button detector 743, a short-range transmission detector such as an RFID detector 753, or a capacitive detector 763, to note but a few. In addition, a local area network may transmit both a visual-range signal and a long-range signal, depending on the configuration of the network. While a local area network is illustrated in FIG. 4 as comprising a long-range transmitter, as illustrated in FIG. 6, a local area transmission may also be a visual-range transmission.

In addition to the movable barrier operator discussed above, such a method may also be configured to operate a gate or alarm system to provide access to a home, compound, or other secure area. For example, if a home has an alarm system, a controller may have receiver(s) configured to receive a long-range transmission to operate an alarm and a visual-range transmission to operator an alarm. If the two signals are received within a set time frame, the alarm is operated by the controller. By operating the alarm system, the controller may be arming or disarming the alarm depending on the signals and system status. Further, the controller may be contained within the alarm system or may also be contained within another device, such as a movable barrier operator.

Figure 8:
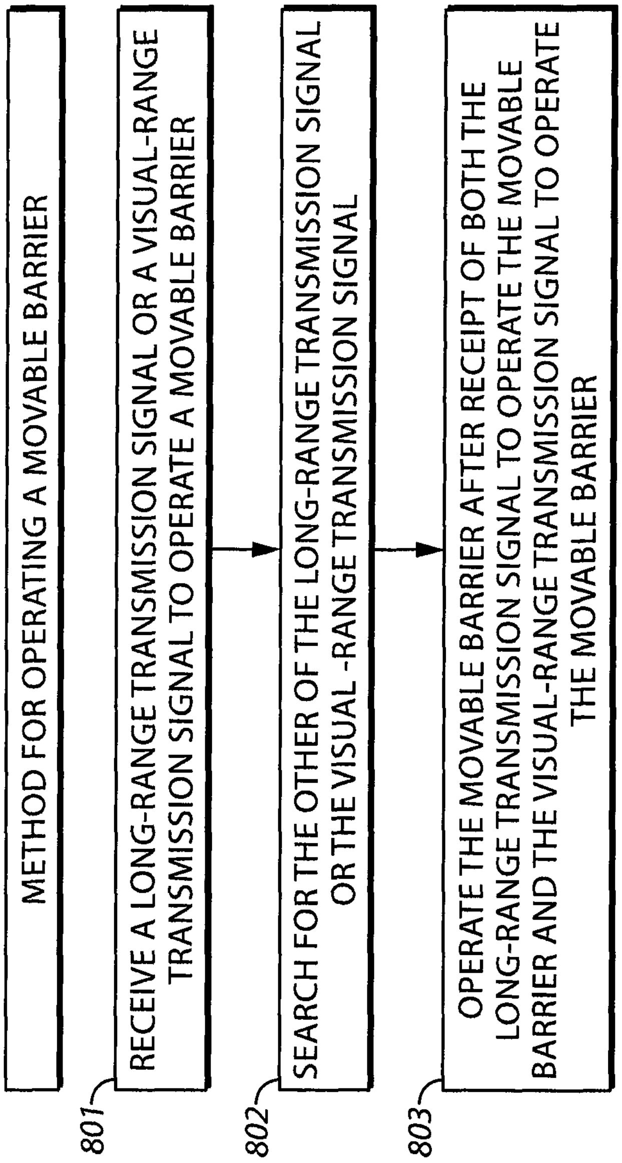
FIG. 8 comprises a block diagram illustrating a method for operating a movable barrier as configured in accordance with various embodiments of the invention.

Turning now to FIG. 8, another example method 800 is illustrated for operating a movable barrier upon receipt of two signals. The method 800 includes receiving 801 a long-range transmission or a visual-range signal. The transmission provides conditional instructions to operate the movable barrier. In response to receipt 801 of a signal, the operator searches 802 for the other of the long-range transmission signal to operate the movable barrier or the visual-range signal to operate the movable barrier. In response to receipt of both the long-range transmission signal and the visual-range signal, the movable barrier operator operates 803 the movable barrier as instructed.

Though the searching 802 and operating 803 is in response to the condition of another step, such conditional allowance does not require that the response be immediate, though in some configurations the next step may immediately begin. In one illustrative embodiment, a start period for the operation of the movable barrier, after receipt of the later of the long-range transmission signal or the visual-range signal is less than about three minutes, though it is anticipated that the time may shorter, as mentioned. For example, the start period may, in one approach, be immediately upon processing of both signals within a given time period.

In yet another illustrative approach, a confirmation signal may be requested or sought once one of the signals is received. For example, a person may submit a visual-range transmission such as by pressing a doorbell or entering an alphanumeric combination into a keypad. Once that short-range signal is received by the operator, a signal may be sent to a long-range device to seeking to obtain a long-range verification transmission. Thus, in searching for a signal, the operator may send a notification that requests such a confirmation transmission. In such a configuration, the system may have a verification mode whereby the doorbell, keypad, or some other device configured to provide a short-range transmission may be placed in a mode that requests a verification signal from the long-range device.

In one aspect, receivers for the long-range and visual-range transmissions are located within a secure area, i.e., behind the gate or movable barrier. Further, it is anticipated that by one approach both the long-range transmission and visual-range transmission are transmitted from outside of the movable barrier or gated area. By another approach, one of the transmissions may be transmitted from behind the movable barrier and/or the gate.

So configured, a gate or other barrier entry system can be operated with increased confidence by a user remote from the gate through the receipt of two signals confirming that operation of the movable barrier operator is authorized. Accordingly, a user can open a barrier remotely upon notification or confirmation that an authorized person needs access to a secured area. Moreover, persons needing periodic access to a secured area can obtain limited access without an owner providing unlimited access for those persons.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

I claim:

1. A method for operating a movable barrier, the method comprising:

receiving a first signal from a first transmitter, the first signal comprising a long-range transmission to operate a movable barrier;

receiving a second signal from a second transmitter, the second signal comprising a visual-range transmission within a set time frame relative to receipt of the first signal; and wherein the first and second signals are received by at least one receiver that is distinct from the first and second transmitters; and operating the movable barrier with an operator, in response to receiving the second signal within the set time frame relative to receipt of the first signal.

2. The method of claim 1, wherein the long-range transmission includes at least one of:

a cell phone transmission;

an internet transmission;

a local area network transmission;

long-range radio transmission; or a plain old telephone system transmission.

3. The method of claim 1, wherein the long-range transmission is generated by at least one of: a wireless transmitter, a communication system terminal, a network communication device, a mobile communication device, or a security system interface.

4. The method of claim 1 wherein receiving the visual-range transmission comprises receiving the visual-range transmission by at least one of a transmitter, a network communication device, a security system interface, a keypad, or a sensing device.

5. The method of claim 4 wherein the sensing device comprises at least one of:

a magnetic detector;

a motion detector device;

a short-range transmission detector;

a capacitive detector;

a weight-based detector; or a push button detector.

6. The method of claim 5 wherein the short-range transmission detector includes at least one of:

a radio frequency detector; or an infrared detector.

7. The method of claim 1 wherein the time frame comprises about ten minutes.

8. A method of operating a movable barrier via receipt of at least two signals, the method comprising:

receiving one of a long-range transmission signal from a first transmitter to operate a movable barrier or a visual-range signal from a second transmitter to operate a movable barrier;

in response to receipt of the long-range transmission signal to operate the movable barrier or the visual-range signal to operate the movable barrier at an at least one receiver, searching for the other of the long-range transmission signal or the visual-range transmissions signal at the at least one receiver, wherein the at least one receiver is distinct from the first and second transmitters; and operating the movable barrier upon receipt of the long-range transmission signal and visual-range signal within a time period after receipt of later of the long-range transmission signal to operate the movable barrier or the visual-range signal to operate the movable barrier.

9. The method of claim 8, wherein a start period for the operation of the movable barrier after receipt of the later of the long-range transmission single or the visual-range signal is less than three minutes.

10. The method of claim 8, further comprising receiving a long-range transmission signal from at least one of a transmitter, a network communication device, a mobile communication device, or a security system interface.

11. The method of claim 8, further comprising receiving a visual-range signal may be received by at least one of a transmitter, a network communication device, a security system interface, a keypad, or a sensing device.

12. The method of claim 11 wherein the sensing device includes at least one of:

a magnetic detector;

a motion detector device;

a short-range transmission detector;

a capacitive detector;

a weight-based detector; or a push button detector.

13. A movable barrier system comprising:

a movable barrier operator connectable to a movable barrier, the movable barrier operator configured to control movement of the movable barrier between a first position and a second position;

at least one long-range receiver configured to receive a long-range transmission signal to operate the movable barrier and at least one visual-range receiver configured to receive a visual-range transmission signal; and a controller connected to the at least one long-range receiver and the at least one visual-range receiver, upon receipt of the long-range transmission signal and upon the visual-range transmission signal being received by the at least one visual-range receiver, the controller being programmed to execute a command to control movement of the movable barrier operator.

14. The movable barrier system of claim 13 wherein the at least one long-range receiver configured and the at least one visual-range receiver comprise a single receiver.

15. The movable barrier system of claim 14, further comprising a long-range transmission signal transmitter.

16. The movable barrier system of claim 15 wherein the long-range transmission signal transmitter includes at least one of: a wireless transmitter, a wired transmitter, a network communication device, a mobile communication device, or a security system interface.

17. The movable barrier system of claim 13, further comprising a visual-range signal transmitter.

18. The movable barrier system of 17, wherein the visual-range signal transmitter includes at least one of: a wireless transmitter, a wired transmitter, a network communication device, a mobile communication device, a security system interface, or a sensing device.

19. The movable barrier system of 18 wherein the sensing device includes at least one of: a magnetic detector, an automatic motion detector, a loop detector, a short-range transmission detector, a capacitive detector, a weight based detector, a push button detector, a keypad, an RF detector, or an IR detector.

20. The movable barrier system of claim 13, wherein long-range transmission signal received may be at least one of:

a mobile communication device signal;

an Internet communication;

a security system communication;

a long-range radio communication.

21. An entry control system for permitting authorized users access to a controlled area by moving a movable barrier, the entry control system comprising:

a movable barrier operator connected to a movable barrier, the movable barrier operator configured to control movement of the movable barrier between an open position and a closed position, wherein the open position permits access to authorized users;

a controller operably coupled to the movable barrier operator, the controller generating a command to move the movable barrier from the closed position to the open position upon receipt of a verification signal within a time frame relative receipt of an operate signal;

at least one receiver configured to detect the verification signal and the operate signal;

wherein the verification signal comprises a long-range signal and the operate signal comprises a short-range signal.

22. A method comprising:

receiving a first signal from a first transmitter, the first signal comprising a long-range transmission to operate an alarm system;

receiving a second signal from a second transmitter, the second signal comprising a visual-range transmission within a set time frame relative to receipt of the first signal; and operating the alarm system, in response to receiving the second signal within the set time frame relative to receipt of the first signal at an at least one receiver that is distinct from the first and second transmitters, wherein operating the alarm system comprises disarming or arming the alarm system.

* * * * *

UNITED STATES PATENT AND TRADEMARK OFFICE

CERTIFICATE OF CORRECTION

PATENT NO. : 8,421,591 B2
APPLICATION NO. : 12/712866
DATED : April 16, 2013
INVENTOR(S) : Mark L. Karasek It is certified that error appears in the above-identified patent and that said Letters Patent is hereby corrected as shown below:

IN THE CLAIMS:

Column 8, Claim 18, Line 54: After "of" insert -- Claim --; and

Column 8, Claim 19, Line 59: After "of" insert -- Claim --.

Signed and Sealed this
Sixth Day of August, 2013

Teresa Stanek Rea
*Acting Director of the United States Patent and Trademark Office*